United States Patent
Gering

(10) Patent No.: US 10,866,048 B2
(45) Date of Patent: Dec. 15, 2020

(54) DEVICE FOR COUNTING LIVE SHOTS, BLANK SHOTS AND DRY SHOTS

(71) Applicant: FN HERSTAL, S.A., Herstal (BE)

(72) Inventor: Armand Gering, Liege (BE)

(73) Assignee: FN HERSTAL, Herstal (BE)

( * ) Notice: Subject to any disclaimer, the term of this patent is extended or adjusted under 35 U.S.C. 154(b) by 0 days.

(21) Appl. No.: 16/407,617

(22) Filed: May 9, 2019

(65) Prior Publication Data

US 2019/0271517 A1    Sep. 5, 2019

Related U.S. Application Data

(62) Division of application No. 15/555,041, filed as application No. PCT/EP2016/055075 on Mar. 10, 2016, now Pat. No. 10,330,414.

(30) Foreign Application Priority Data

Mar. 10, 2015  (BE) .................................. 2015/5126

(51) Int. Cl.
| | |
|---|---|
| *F41A 19/01* | (2006.01) |
| *G06M 1/10* | (2006.01) |
| *H02K 1/14* | (2006.01) |

(52) U.S. Cl.
CPC ............. *F41A 19/01* (2013.01); *G06M 1/105* (2013.01); *H02K 1/145* (2013.01)

(58) Field of Classification Search
CPC ......... F41A 19/01; G06M 1/105; H02K 1/145
USPC .................................................. 42/1.03, 1.04
See application file for complete search history.

(56) References Cited

U.S. PATENT DOCUMENTS

| | | | | |
|---|---|---|---|---|
| 2,272,574 A | * | 2/1942 | Nothe ..................... | F41A 19/01 116/282 |
| 4,757,629 A | * | 7/1988 | Austin .................... | F41A 19/59 42/84 |
| 6,425,199 B1 | * | 7/2002 | Vaid ......................... | F41A 9/65 42/69.01 |
| 6,643,968 B2 | * | 11/2003 | Glock ..................... | F41A 19/01 42/1.02 |

(Continued)

FOREIGN PATENT DOCUMENTS

| | | |
|---|---|---|
| DE | 4022038 A1 | 1/1992 |
| EP | 1881292 A1 | 1/2008 |

OTHER PUBLICATIONS

International Search Report and Written Opinion for International Application No. PCT/EP2016/055075, dated Apr. 28, 2016.

(Continued)

*Primary Examiner* — Samir Abdosh
(74) *Attorney, Agent, or Firm* — Leydig, Voit & Mayer, Ltd.; Gerald T. Gray

(57) ABSTRACT

The invention relates to a device for detecting and counting live bullet shots, blank shots and dry-firing actuation of the striker for all types of semi-automatic or automatic weapons, said device being able to discriminate between said three events and comprising: an electronic circuit; a first sensor for detecting a movement of a part of the weapon preceding a potential live bullet shot or blank shot; and a second sensor for measuring recoil acceleration when the live bullet shot or blank shot has been fired.

10 Claims, 1 Drawing Sheet

(56) References Cited

U.S. PATENT DOCUMENTS

| | | | | |
|---|---|---|---|---|
| 8,826,575 B2* | 9/2014 | Ufer | ......................... | F41A 19/01 42/1.01 |
| 2003/0061753 A1* | 4/2003 | Glock | ..................... | F41A 19/01 42/1.02 |
| 2006/0042142 A1* | 3/2006 | Sinha | ...................... | F41C 27/00 42/1.01 |
| 2010/0251586 A1* | 10/2010 | Packer | .................... | F41A 19/01 42/1.01 |
| 2011/0252684 A1* | 10/2011 | Ufer | ......................... | F41A 19/01 42/1.03 |
| 2012/0144711 A1* | 6/2012 | Glock | ..................... | F41A 19/01 42/1.03 |
| 2015/0113847 A1* | 4/2015 | Acarreta | ................. | F41A 19/01 42/1.01 |
| 2017/0248388 A1* | 8/2017 | Young | .................... | F41A 19/01 |

OTHER PUBLICATIONS

U.S. Appl. No. 15/555,041, filed Aug. 31, 2017.

* cited by examiner

DEVICE FOR COUNTING LIVE SHOTS, BLANK SHOTS AND DRY SHOTS

CROSS-REFERENCES TO RELATED APPLICATIONS

This application is a Divisional of U.S. application Ser. No. 15/555,041, filed Aug. 31, 2017, which is hereby incorporated by reference herein.

FIELD OF THE INVENTION

The present invention pertains to a device for detecting and counting live bullet shots, blank shots, and dry-firing actuation of the striker, being able to discriminate among these three events in a reliable manner.

The present invention also pertains to every type of weapon comprising this device.

The present invention further involves a method able to detect, discriminate and count the aforementioned shots and dry-firing actuations of the striker.

TECHNOLOGICAL BACKGROUND AND PRIOR ART

The wear on a weapon and, hence, the maintenance to be provided depends on the movement of the movable parts and thus the conditions of use of the weapon, such as the number of shots fired. It is therefore important to provide the weapons with devices for counting the shots fired.

The known devices perform a counting based on the detecting of phenomena or a combination of phenomena subsequent to the shot, which phenomena are known as a posteriori, contrary to a priori phenomena which occur prior to the firing of the shot. As an example, the following table contains a list of a priori and a posteriori phenomena occurring during the functioning of a weapon.

| A priori | A posteriori |
| --- | --- |
| Loading into chamber | Recoil acceleration |
| Releasing of movable parts | Movement of the slide |
| Placement of the loader | Recocking of the hammer |
| Movement of the safety lever | Rear impact |
| Pressing on the trigger | Barrel heat |
| Dropping of the hammer | Sound |
| Movement of the striker | Pressure variation in the chamber or in the barrel |

For the most part, the shot counting devices work by analysis of the recoil acceleration experienced by the weapon or an internal part of the weapon following the shot. In the patent literature, the documents U.S. Pat. Nos. 8,387,295; 5,566,486; EP 1 881 292 and U.S. Pat. No. 8,418,388 may be cited where the counting is done on the basis of the signal of the recoil acceleration.

Certain of these devices (U.S. Pat. Nos. 8,387,295; 5,566,486 and EP 1 881 292) use a battery to ensure the energizing of the electronic circuit with possible monitoring of the circuit by a phenomenon connected to the event being detected. The disadvantage of batteries is that this increases the probability of counting error due to a failure or a removal of the battery and this shortens the lifetime of the counting device. Hence, document U.S. Pat. No. 8,418,388 proposes a different solution with recuperation of the energy provided by the movement of a part of the weapon. Document US 2010/0251586 likewise proposes a shot counting device with energizing of the electronic circuit via the electromotive force induced by the displacement of a magnet inside a coil, which is coupled to a moving part of the weapon.

Whether with or without recuperation of energy, the devices which work by detecting a posteriori phenomena have three major technical problems:

1. There is a possible confusion between events, resulting in a counting error. For example, the discrimination between live bullet shots and blank shots can only be done by detecting and/or analyzing the very first milliseconds after the detonation. In fact, a blank shot is characterized in having a phase of acceleration to the front for several milliseconds prior to the recoil. Intrinsic delays in the propagation of the recoil or the movements of parts associated with this recoil, added to the necessary time, make impossible any discrimination free of error. Further, the discrimination between a shot and an impact is not always easy, since the measuring of the mere amplitude of the recoil acceleration does not allow a systematic discrimination between a shot and an impact, in particular one due to dropping the weapon.

2. It is impossible to count dry-firing actuations of the striker, i.e., with no ammunition in the chamber, since the latter are not followed by a recoil acceleration.

3. The device cannot work if the recoil of the weapon used for the detecting, or energizing of the circuit is insufficient, especially in the case of devices recuperating the energy generated by the shot. For example, a weapon held firmly at the moment of firing will not recoil, or not sufficiently. In this case, the counting devices with recuperation of energy will not be able to energize the electronic circuit and therefore count the shot. As another example, a very dirty weapon cannot work properly, even though a shot has been fired. In this case, certain a posteriori phenomena used to detect and/or energize the circuit cannot take place, and then the shot also is not counted. Mention may be made, without being exhaustive, of the aforesaid lack of a recoil, the incomplete closure of the chamber, the absence of a rear impact.

PURPOSES OF THE INVENTION

The purpose of the present invention is to realize a device able to detect and count live bullet shots, blank shots, and dry-firing actuations of the striker, and this for every type of firearm, by distinguishing among these three types of events with no possible confusion with an impact not involving the firing of a shot (rough handling, dropping the weapon, etc.).

Moreover, the present invention intends to realize a device for detection and counting of shots whose operation has no negative impact on the behavior of the weapon.

The present invention likewise intends to realize an autonomous device not requiring batteries as a means of energizing electronic circuits responsible for the functions of counting and memorization.

Figure 1:
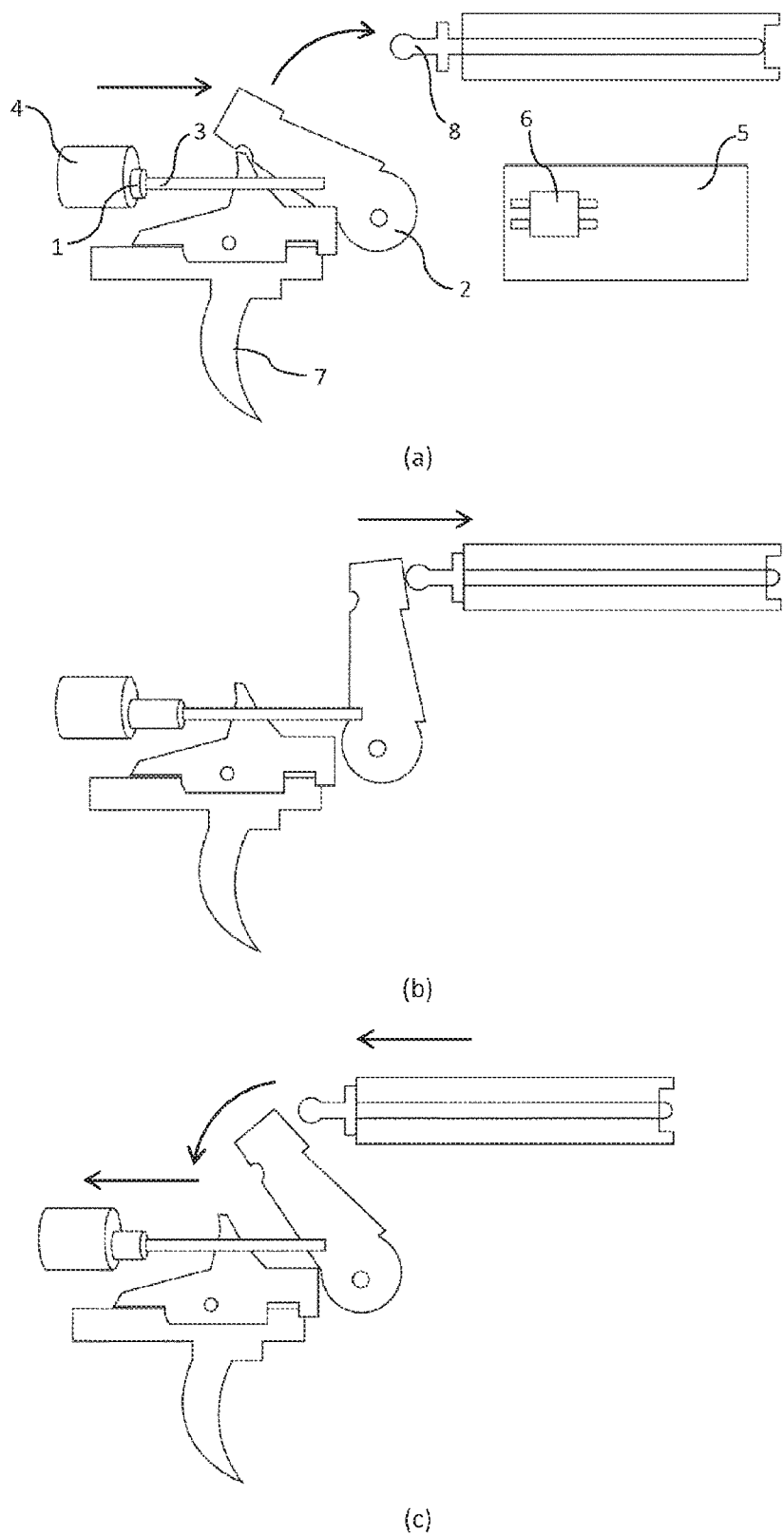
FIG. 1 represents sequentially the movement of the hammer when firing a shot or upon dry-firing actuation of the striker, resulting in the displacement of a magnet inside a coil. This movement is based on the principle of detection and counting of the device according to one variant of the invention. In (a) and (b), the hammer moves in order to hit the striker. In (c), after the live shot or the blank shot, the hammer returns. Schematically, the electronic circuit and the recoil sensor are likewise represented.

LEGEND (1) Magnet
(2) Weapon part or hammer
(3) Rod with the hammer spring
(4) Armature or coil
(5) Electronic circuit
(6) Acceleration sensor
(7) Trigger
(8) Striker

PRINCIPAL CHARACTERISTIC ELEMENTS OF THE INVENTION

According to the invention, the electronic circuit can be energized by battery or by energy recuperation. In order to avoid any confusion in the text, it shall be stipulated that, in the former case, reference is made to the circuit being awakened after an a priori movement and, in the latter case, reference is made to the circuit being energized after an a priori movement. Likewise, it shall be mentioned that the circuit is awakened or energized when the speed of displacement of the part of the weapon exceeds a critical speed. It is obvious that this critical reference value may be expressed in the form of an energy threshold, rather than in the form of a speed threshold.

The present invention is more particularly detailed for a detection system based on a magnet and coil pair. By coil is meant a simple winding or a more complex arrangement, such as one comprising several windings interconnected head to tail. Likewise, for the magnet, this may be a simple monobloc magnet or a more complex magnet structure. It is moreover conceivable that the system is devised so that the axis of the magnet is perpendicular to the direction of the movement being detected.

The present invention pertains to a device for counting live bullet shots, blank shots, and dry-firing actuation of the striker for every type of weapon, said device being able to discriminate among these three events and comprising:
an electronic circuit,
a first sensor designed to detect a movement of a part of the weapon preceding a potential live bullet shot or a blank shot,
a second sensor designed to measure a recoil acceleration when the live bullet shot or blank shot has been fired.

According to particular embodiments of the invention, the device comprises at least one or a suitable combination of the following characteristics:
the electronic circuit is configured to be awakened or energized on the basis of the detection of a movement by the first sensor;
the awakening or the energizing of the electronic circuit only occurs if the part of the weapon has a speed of displacement greater than a reference speed;
the first sensor is designed to detect the movement of a part of the weapon by the variation of a magnetic field in an armature;
the armature serves as a detector of movement and also as a generator of energy for the energizing of the electronic circuit;
the first sensor is designed to detect the movement of the hammer of the weapon or any element connected to the movement of the hammer;
the first sensor is integrated in the hammer, the release, the trigger, the slide, the piston, the bolt or the feed lever;
the first sensor is of electromagnetic type comprising a coil integrated in the body of the weapon and a magnet integrated in said part of the weapon and designed to be displaced within the coil;
the device is configured to detect, discriminate, and count a shot, whether a live bullet shot or a blank shot, and a dry-firing actuation of the striker, on the basis of the following criteria:
when the first sensor detects a movement in a single direction of the part of the weapon, a dry-firing actuation of the striker is detected,
when the first sensor detects successive movements in opposite directions of the part of the weapon, a shot is detected;
when a shot is detected, said device is configured to discriminate a live bullet shot from a blank shot on the basis of the following criteria:
when the second sensor measures an acceleration of the weapon in a single direction, a live bullet shot is detected,
when the second sensor measures an acceleration of the weapon in one direction followed by an acceleration in an opposite direction, a blank shot is detected.

The present invention likewise pertains to a weapon comprising the counting device as described above.

According to one variant, the weapon is provided with a first sensor coupled to the hammer, to a release or a trigger for a rifle and a pistol, or to the slide, the bolt, the release, the trigger or the feed lever of a machine gun. According to another variant, the weapon is provided with the first sensor coupled to the piston for a rifle and a machine gun.

The present invention likewise pertains to a method for counting live bullet shots, blank shots, and dry-firing actuation of the striker for a weapon, involving a step of detection and analysis of the movement of a part of the weapon prior to a potential live bullet shot or blank shot.

According to particular embodiments of the invention, the method involves at least one or an appropriate combination of the following characteristics:
it involves an additional step of measurement of a recoil acceleration of the weapon or a part of the weapon if the live bullet shot or blank shot has taken place;
the discrimination between the live bullet shot, the blank shot, and the dry-firing actuation of the striker is done as follows:
it is a dry-firing actuation of the striker when the part of the weapon is displaced in a single direction,
it is a live bullet shot or a blank shot when the part of the weapon is displaced successively in two opposite directions;
the discrimination between the blank shot and the live bullet shot is done as follows:
it is a blank shot when the recoil acceleration comprises two components of opposite directions,
it is a live bullet shot when the recoil acceleration comprises one component in a single direction;
the discrimination between the blank shot and the live bullet shot is done on the basis of the time between the successive displacements of the part of the weapon;
it involves a step of awakening or energizing an electronic circuit providing the functions of counting and memorization of the live bullet shots, blank shots, and dry-firing actuations of the striker when the part of the weapon is displaced with a speed greater than a reference speed.

GENERAL DESCRIPTION OF THE INVENTION

The device according to the invention counts the live bullet shots, the blank shots, and the dry-firing actuations of the striker, also known as dry shots, with no confusion between these events and any other impact which might occur on the weapon. This device is adaptable to every type of automatic or semiautomatic firearm (rifle, pistol, machine gun, submachine gun).

The device comprises means able to detect, directly or indirectly, one or more phenomena occurring prior to the start of the shot, i.e., a priori, in combination with a phenomenon a posteriori once the shot has departed. Preferably, the energy resulting from the movement of parts prior to the start of the shot is converted and utilized to energize the electronic circuits providing for the functions of counting and memorization.

The device according to the invention performs its counting on the basis of one of the following a priori phenomena, without claiming to be an exhaustive listing: pressing on the trigger, the movement of the release, the movement of the hammer, the movement of the striker. Preferably, the counting is done on the basis of a part in movement well before the firing, which makes it possible to awaken or energize the electronic circuit sufficiently early before the firing. Thus, the counting is preferably done on the basis of the movement of the hammer, the trigger or the release of a rifle or a pistol, rather than on the basis of the movement of the striker. In fact, as compared to the movement of the striker, the detection occurs several milliseconds earlier for the hammer, the release, and the trigger. These milliseconds may be critical to discriminating the blank shot from the live bullet shot, as specified above. In the case of a machine gun, the detection is done on the basis of any a priori movement of parts such as the slide, the bolt, the release, the trigger and the feed lever. For a machine gun, the movement of the piston which, although being an event subsequent to the firing, may be used as an a priori event for the following shot may further be mentioned. The piston may also be added in the case of a rifle.

The device comprises an electronic circuit and two sensors. A first sensor detects the movement of a movable part of the weapon prior to the start of a potential shot and a second sensor measures the recoil acceleration following the shot, when it has taken place. The first sensor may be a sensor of electromagnetic type, an optical sensor, a capacitive sensor, an inductive sensor, etc.

As a nonlimiting example, the device according to the invention is described below for a detection, a counting and a memorization of live shots, blank shots, and dry shots based on an a priori phenomenon, being the movement of the hammer as detected by a sensor able to transform a rapid movement into an electric signal by induction. Again as an example, the sensor described below is a sensor of electromagnetic type formed by a magnet and a coil.

DETAILED DESCRIPTION OF THE INVENTION

The device according to the invention, shown schematically in FIG. 1, comprises:
- a magnet 1 integrated in the movement of the hammer 2 via the rod 3 of the hammer spring,
- a coil 4 integrated in the body of the weapon through which the magnet 1 can move,
- an electronic circuit 5,
- an acceleration sensor 6.

The principle of operation of the device according to the invention is as follows. When the hammer 2 is in movement, the magnet 1 stirs in the coil 4 and induces there a measurable current which is a function of the speed of displacement of the hammer and whose direction is connected to that of the movement of the hammer. The coil is thus used as a detector:
- of the movement of the hammer,
- of the speed of displacement of the hammer,
- of the direction of movement of the hammer.

Preferably, the coil is likewise used as a generator of the energy needed to energize the electronic circuit making possible the operations of counting, discrimination and memorization of the events. It should be noted that, if the movement of the hammer does not occur or is not rapid enough, the circuit is not energized. This is not harmful, since it means that the striker has not been hit by the hammer or at least not hit with enough energy to be damaging to the mechanism or to result in the start of a shot. This energy threshold is a characteristic which makes the striking of the hammer the necessary and sufficient condition for the energizing of the circuit which is supposed to detect it. Moreover, this particular embodiment makes it possible to use only a single element (the coil) to realize two functions: detection and energizing.

The detection of the events is done by the following principle, illustrated in FIG. 1:

i. The striking of the hammer without a shot corresponds to a rapid movement of the magnet in the coil in one direction, and thus a current induced in a precise direction. The sufficiently rapid movement generates enough energy to awaken or energize the circuit.

ii. The striking of the hammer with a shot corresponds to a rapid movement of the magnet in the coil in one direction (case i.) followed by a rapid movement in the other direction, which is the recocking of the hammer after the shot. Two successive currents of contrary direction are thus generated in the coil with a very precise timing which depends on the type of weapon and which can be memorized as a detection reference. Typically, the two successive movements occur at an interval of time less than a few milliseconds, more precisely less than 10 ms, or even less than 2 ms. It should be noted that the energy of the two movements may be utilized after rectification of one of the alternations. This is useful for communicating sufficient energy to the circuit in the case of a clock measurement. The time between two shots is measured since the circuit is energized for a sufficient time, that is, at least a time equal to the clock period.

iii. When a shot is fired (case ii.), the circuit has detected it and can with the aid of the acceleration sensor measure the acceleration of the impact following this shot. It should be noted that the direction of the acceleration may be enough to discriminate blank shots from live bullet shots.

In conclusion, the following table summarizes the principle of detection of events when a second sensor is used to discriminate a live bullet shot from a blank shot:

|  | Striking of the hammer | Recocking of the hammer | Acceleration to the front |
|---|---|---|---|
| Dry-firing actuation of the striker | V | / | / |
| Live bullet shot | V | V | / |
| Blank shot | V | V | V |

In conclusion, the present invention does not rule out the energization being done with the aid of a battery rather than recuperation of the energy of a movement of a part prior to the start of the shot. In this case, the detection of the a priori movement may be used to awaken the electronic circuit.

ADVANTAGES OF THE INVENTION

The sensor for detection of the movement of a part prior to the start of the shot, combined with the acceleration sensor, enables a discriminating between a dry-firing actuation of the striker and a shot, on the one hand, and a live bullet shot from a blank shot, on the other hand.

It is particularly advantageous to base the detection on the movement of the hammer, the release, the trigger, the slide, the piston, the bolt or the feed lever, since these are robust parts which can tolerate the addition of a magnet. It is more difficult to integrate the magnet in the striker, since the latter is a complex and fragile part which is liable to malfunction if it becomes heavier.

The energy recuperated is not that resulting from the movement of the parts of the weapon or the weapon itself following the start of the shot, but rather that from the movement of parts prior to the start of the shot, whether or not it takes place. This has the advantage that the circuit is awakened or energized prior to the start of the shot, which avoids any confusion between live bullet shots and blank shots, since the system is able to detect and measure the entirety of the recoil acceleration and thus all the discriminant parameters contained in the signal, particularly the direction of the recoil acceleration. Thus, there is no confusion between a dropping of the weapon and a shot, since the device is not awakened following an acceleration or a phenomenon subsequent to an acceleration. Thus, a rough handling will never be detected and confused with a shot.

The probability of counting a shot in the case of no recoil or an insufficient recoil of the weapon or its internal parts is distinctly greater, since the device detects a phenomenon prior to the shot, whether or not it occurs and (/or) whether it generates a sufficient recoil or not.

The invention claimed is:

1. A method for identifying firing events of a weapon, the firing events including live bullet shots, blank shots, and dry-firing actuations of a striker of the weapon, the method comprising:
    detecting and analyzing a movement of a part of the weapon prior to a potential live bullet shot or blank shot, and
    measuring a recoil acceleration of the weapon when the potential live bullet shot or blank shot has taken place, and
    detecting and discriminating between the firing events including:
        detecting a firing event as a dry-firing actuation of the striker when the part of the weapon is displaced in a single direction,
        detecting the firing event as a live bullet shot or a blank shot when the part of the weapon is displaced successively in two opposite directions,
        detecting the firing event as a blank shot when the recoil acceleration comprises two components of opposite directions, and
        detecting the firing event as a live bullet shot when the recoil acceleration comprises one component in a single direction.

2. The method as claimed in claim 1 further comprising awakening or energizing an electronic circuit providing the functions of counting and memorization of the firing events when the part of the weapon is displaced with a speed greater than a reference speed.

3. The method as in claim 1, wherein the weapon is a semiautomatic or an automatic weapon, said weapon comprising:
    an electronic circuit,
    a first sensor configured to detect the movement of the part of the weapon prior to the potential live bullet shot or blank shot, and
    a second sensor configured to measure the recoil acceleration when the potential live bullet shot or blank shot has taken place.

4. The method of claim 3, wherein the first sensor detects the movement of the part of the weapon prior to the potential live bullet shot or blank shot.

5. The method of claim 3, wherein the first sensor detects the movement of a feed lever, a slide, a bolt, a release or a trigger of a machine gun.

6. The method of claim 3, wherein the first sensor detects the movement of a piston of a rifle or a machine gun.

7. The method of claim 3, wherein an awakening or an energizing of the electronic circuit occurs when the first sensor detects the movement.

8. The method of claim 7, wherein the awakening or the energizing of the electronic circuit only occurs when the part of the weapon has a speed of displacement greater than a reference speed.

9. The method of claim 3, wherein an armature serves as a detector of movement and as a generator of energy for energizing of the electronic circuit.

10. The method of claim 3, wherein the first sensor is an electromagnetic sensor comprising a coil integrated in the body of the weapon and a magnet integrated in said part of the weapon, said magnet configured to be displaced within the coil.

* * * * *